US009258122B1

(12) United States Patent
Zhang et al.

(10) Patent No.: US 9,258,122 B1
(45) Date of Patent: Feb. 9, 2016

(54) SYSTEMS AND METHODS FOR SECURING DATA AT THIRD-PARTY STORAGE SERVICES

(71) Applicant: Symantec Corporation, Mountain View, CA (US)

(72) Inventors: Haibin Zhang, Davis, CA (US); Scott Schneider, Sun Valley, CA (US); Walter Bogorad, Danville, CA (US); Sharada Sundaram, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 41 days.

(21) Appl. No.: 14/199,339

(22) Filed: Mar. 6, 2014

Related U.S. Application Data

(60) Provisional application No. 61/926,555, filed on Jan. 13, 2014.

(51) Int. Cl.
*H04L 29/06* (2006.01)
*H04L 9/14* (2006.01)
*H04L 9/08* (2006.01)

(52) U.S. Cl.
CPC .............. *H04L 9/14* (2013.01); *H04L 9/0825* (2013.01); *H04L 9/0833* (2013.01); *H04L 9/0891* (2013.01)

(58) Field of Classification Search
CPC ... H04L 9/0891; H04L 9/0833; H04L 9/0825; H04L 63/0442; H04L 63/065; H04L 9/14; G06F 21/6218
USPC .......... 713/171, 150, 151, 152, 153, 154, 182
See application file for complete search history.

(56) References Cited

U.S. PATENT DOCUMENTS

| 6,226,618 | B1 * | 5/2001 | Downs et al. .................... 705/51 |
| 7,653,202 | B2 * | 1/2010 | Randell ......................... 380/286 |
| 8,321,669 | B2 * | 11/2012 | Dancer ......................... 713/168 |
| 8,401,185 | B1 | 3/2013 | Telang |
| 8,458,494 | B1 | 6/2013 | Bogorad |
| 2004/0010467 | A1 * | 1/2004 | Hori et al. ....................... 705/50 |
| 2004/0175000 | A1 * | 9/2004 | Caronni ......................... 380/285 |
| 2005/0157880 | A1 * | 7/2005 | Kurn et al. .................... 380/279 |

(Continued)

OTHER PUBLICATIONS

Fanglu Guo, et al; Systems and Methods for Validating Ownership of Deduplicated Data; U.S. Appl. No. 13/314,496, filed Dec. 8, 2011.

(Continued)

*Primary Examiner* — Chau Le
*Assistant Examiner* — Don Zhao
(74) *Attorney, Agent, or Firm* — ALG Intellectual Property, LLC

(57) ABSTRACT

A computer-implemented method for securing data at third-party storage services may include (1) receiving, at a server-side computing system, a request to provide a user with access to a file that is encrypted, (2) determining, in response to the request, whether a transitory symmetric key of the user is available to encrypt a decryption key with which the file may be decrypted, (3) encrypting the decryption key with the transitory symmetric key of the user if the transitory symmetric key of the user is available or encrypting the decryption key with the public key of an asymmetric key pair designated for the user if the transitory symmetric key of the user is unavailable, and (4) storing the encrypted decryption key. Various other methods, systems, and computer-readable media are also disclosed.

20 Claims, 12 Drawing Sheets

(56) References Cited

U.S. PATENT DOCUMENTS

| | | | | |
|---|---|---|---|---|
| 2007/0091914 A1* | 4/2007 | Ashley | | 370/462 |
| 2007/0160202 A1* | 7/2007 | Wilt et al. | | 380/30 |
| 2007/0266258 A1* | 11/2007 | Brown et al. | | 713/183 |
| 2008/0133935 A1 | 6/2008 | Elovici et al. | | |
| 2009/0245522 A1* | 10/2009 | Kudo et al. | | 380/280 |
| 2009/0300712 A1* | 12/2009 | Kaufmann et al. | | 726/1 |
| 2010/0095118 A1* | 4/2010 | Meka | | 713/168 |
| 2010/0290623 A1* | 11/2010 | Banks et al. | | 380/277 |
| 2015/0143112 A1 | 5/2015 | Yavuz et al. | | |

OTHER PUBLICATIONS

Anthony Langsworth; Systems and Methods for Encoding Data; U.S. Appl. No. 13/240,959, filed Sep. 22, 2011.

Srinivas Chenna; Systems and Methods for Transferring Authentication Credentials; U.S. Appl. No. 13/483,835, filed May 30, 2012.

Steve Chazin, et al; Systems and Methods for Sharing Data Stored on Secure Third-Party Storage Platforms; U.S. Appl. No. 13/952,487, filed Jul. 26, 2013.

Kamara, Seny et al., "Cryptographic Cloud Storage", http://research.microsoft.com/en-us/people/klauter/cryptostoragerlcps.pdf, as accessed Jan. 7, 2014, Workshop on Real-Life Cryptographic Protocols and Standardization, 2010.

Rogaway, Phillip et al., "The Security of Ciphertext Stealing", http://www.cs.ucdavis.edu/~rogaway/papers/steal.pdf, as accessed Jan. 7, 2014, 19th International Workshop on Fast Software Encryption, FSE 2012, Washington, D.C., USA, (Mar. 20, 2012).

Deb Banerjee; Systems and Methods for Scanning Data Stored on Cloud Computing Platforms; U.S. Appl. No. 13/925,357, filed Jun. 24, 2013.

Walter Bogorad, et al.; Systems and Methods for Secure Third-Party Data Storage; U.S. Appl. No. 14/092,757, filed Nov. 27, 2013.

"lucenetransform", https://code.google.com/p/lucenetransform/, as accessed Jan. 7, 2014, (Nov. 20, 2011).

"Dropbox", http://www.dropbox.com, as accessed Jan. 7, 2014, (Dec. 26, 1996).

Scott Schneider, et al.; Systems and Methods for Searching Shared Encrypted Files on Third-Party Storage Systems; U.S. Appl. No. 14/199,158, filed Mar. 6, 2014.

Haibin Zhang, et al.; Systems and Methods for Maintaining Encrypted Search Indexes on Third-Party Strorage Systems; U.S. Appl. No. 14/199,240, filed Mar. 6, 2014.

Kamara, Seny et al., "Cryptographic Cloud Storage", Proceedings of Financial Cryptography: Workshop on Real-Life Cryptographic Protocols and Standardization (RLCPS '10), (Jan. 2010).

Goh, Eu-Jin "Secure Indexes", http://crypto.stanford.edu/~eujin/papers/secureindex/secureindex.pdf, (May 5, 2004).

Attila Altay Yavuz, et al.; Method for Dynamic, Non-Interactive and Parallelizable Searchable Symmetric Encryption With Secure and Efficient Updates; U.S. Appl. No. 61/892,641, filed Oct. 18, 2013.

"Solr", http://lucene.apache.org/solr/, as accessed Jan. 7, 2014, The Apache Software Foundation, (Jan. 19, 2007).

"Lucene", http://lucene.apache.org/, as accessed Jan. 7, 2014, The Apache Software Foundation, (Feb. 16, 2005).

* cited by examiner

SYSTEMS AND METHODS FOR SECURING DATA AT THIRD-PARTY STORAGE SERVICES

CROSS REFERENCE TO RELATED APPLICATION

This application claims the benefit of U.S. Provisional Application No. 61/926,555, filed 13 Jan. 2014, the disclosure of which is incorporated, in its entirety, by this reference.

BACKGROUND

Organizations and consumers increasingly use third-party services to store data. Third-party storage services may provide a number of benefits to customers, including flexibility, low capitalization requirements, add-on services, data sharing, and centralized access to data. When using third-party storage services, many customers want or need their data to be stored in an encrypted state due to privacy concerns or in order to ensure compliance with internal or external data-protection requirements, such as governmental laws and regulations, partnership agreements with other organizations, etc.

While some conventional third-party storage services may store customer data in an encrypted state, the mechanisms used by such conventional third-party storage services may present unwanted limitations. For example, some conventional third-party storage services may enable customers to encrypt their data prior to submitting the same. Unfortunately, encrypting data prior to submission may interfere with the ability of third-party storage services to efficiently share the data with other customers where directed. Other conventional third-party storage services may encrypt data submitted by customers using cryptographic keys that are stored at the third-party storage services even when the customers are not logged in. In these situations, the customers' data may be vulnerable to being accessed by unauthorized parties (e.g., intruders and/or administrators of the third-party storage services) even when the customers are not logged in. Accordingly, the instant disclosure identifies and addresses a need for additional and improved systems and methods for securing data at third-party storage services.

SUMMARY

As will be described in greater detail below, the instant disclosure describes various systems and methods for securing data at third-party storage services. In one example, a computer-implemented method for securing data at third-party storage services may include (1) receiving, at a server-side computing system, a request to provide a user with access to a file that is encrypted, (2) determining, in response to the request, whether a transitory symmetric key of the user (e.g., a transitory symmetric key generated using information provided by the user, such as the user's password) is available to encrypt a decryption key with which the file may be decrypted, (3) encrypting, in response to determining that the transitory symmetric key of the user is available, the decryption key with the transitory symmetric key of the user, and (4) storing the encrypted decryption key at the server-side computing system. In some examples, the decryption key may be required to be encrypted when stored at the server-side computing system.

In another example, a computer-implemented method for securing data at third-party storage services may include (1) receiving, at a server-side computing system, a request to provide a user with access to a file that is encrypted, (2) determining, in response to the request, whether a transitory symmetric key of the user is available to encrypt a decryption key with which the file may be decrypted, (3) identifying, in response to determining that the transitory symmetric key of the user is unavailable, an asymmetric key pair designated for the user that includes a public key and a private key that is encrypted and that may be decrypted using information provided by the user, (4) encrypting the decryption key with the public key, and (5) storing the encrypted decryption key at the server-side computing system.

In some embodiments, the transitory symmetric key of the user may be available to encrypt the decryption key only when the user is logged into the server-side computing system. In some embodiments, the private key may be encrypted and decrypted with an additional transitory symmetric key of the user that may be generated using information provided by the user.

In some embodiments, the method may further include (1) receiving, at the server-side computing system, a password of the user as part of an attempt by the user to log into the server-side computing system and (2) generating the transitory symmetric key of the user based at least in part on the password.

In some embodiments, the step of generating the transitory symmetric key of the user may include (1) generating an intermediate key (e.g., a master key from which other keys may be generated for the user) by applying a key-stretching function to the password of the user and (2) generating the transitory symmetric key by applying a pseudo-random function (PRF) to the intermediate key.

In some embodiments, the method may further include (1) generating an additional transitory symmetric key by applying the pseudo-random function to the intermediate key, wherein the additional transitory symmetric key and the transitory symmetric key are different and the additional transitory symmetric key may be used to decrypt the encrypted private key, (2) decrypting the private key with the additional transitory symmetric key, (3) decrypting the decryption key with the private key, and (4) encrypting the decryption key with the transitory symmetric key.

In some embodiments, the method may further include (1) receiving a request from the user to access the file, (2) decrypting the decryption key with the transitory symmetric key, (3) using the decryption key to access the file, and (4) providing access to the file to the user.

In some embodiments, the decryption key may be a group key that is used to encrypt and decrypt a file key designated for encrypting and decrypting the file and accessible to at least two users that share access to the file, and the step of using the decryption key to access the file may include decrypting the file key with the group key and decrypting the file with the file key. In some embodiments, the file may be a document or a search index.

In one embodiment, a system for implementing the above-described method may include (1) a receiving module that receives, at a server-side computing system, a request to provide a user with access to a file that is encrypted, and (2) a determining module that determines, in response to the request, whether a transitory symmetric key of the user is available to encrypt a decryption key with which the file may be decrypted. The system may also include an encrypting module that (1) in response to determining that the transitory symmetric key of the user is available, encrypts the decryption key with the transitory symmetric key of the user and/or (2) in response to determining that the transitory symmetric key of the user is unavailable, (i) identifies an asymmetric key pair designated for the user that may include a public key and a private key that is encrypted and that may be decrypted using information provided by the user and (ii) encrypts the decryption key with the public key. The system may further include a storing module that stores the encrypted decryption key at the server-side computing system and at least one processor that executes the receiving module, the determining module, the encrypting module, and the storing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, at a server-side computing system, a request to provide a user with access to a file that is encrypted, (2) determine, in response to the request, whether a transitory symmetric key of the user is available to encrypt a decryption key with which the file may be decrypted, (3) in response to determining that the transitory symmetric key of the user is available, encrypt the decryption key with the transitory symmetric key of the user, and (4) store the encrypted decryption key at the server-side computing system.

Additionally or alternatively, the computer-readable medium may include one or more computer-executable instructions that, when executed by at least one processor of a computing device, may cause the computing device to (1) receive, at a server-side computing system, a request to provide a user with access to a file that is encrypted, (2) determine, in response to the request, whether a transitory symmetric key of the user is available to encrypt a decryption key with which the file may be decrypted, (3) in response to determining that the transitory symmetric key of the user is unavailable, identify an asymmetric key pair designated for the user that may include a public key and a private key that is encrypted and that may be decrypted using information provided by the user, (4) encrypt the decryption key with the public key, and (5) store the encrypted decryption key at the server-side computing system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
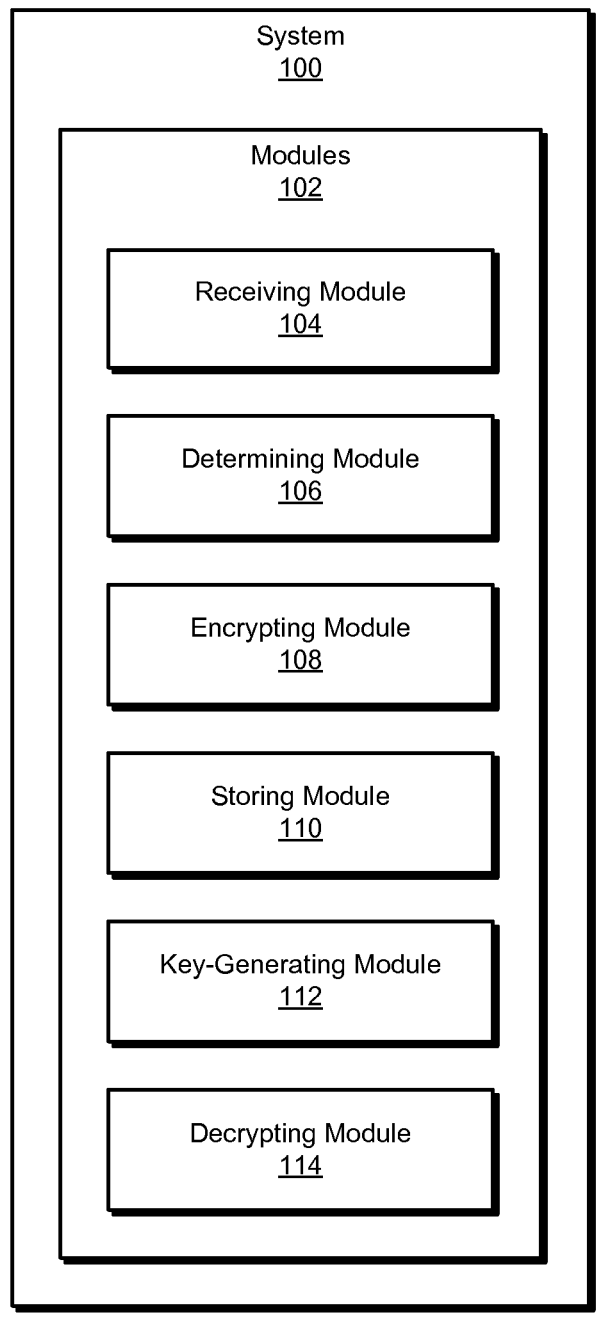
FIG. 1 is a block diagram of an exemplary system for securing data at third-party storage services.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for securing data at third-party storage services. As will be explained in greater detail below, by encrypting a user's files stored on a third-party storage system with transitory symmetric keys that are (1) generated from information provided by the user and (2) discarded or forgotten when the user logs out of the third-party storage system, the systems and methods described herein may improve the security of the user's files stored at the third-party storage system, especially when the user is not logged into the third-party storage system.

Moreover, by using symmetric-key cryptography instead of asymmetric-key cryptography to encrypt decryption keys when possible, the systems and methods described herein may reduce the computational load required to encrypt and share files. Furthermore, in some examples, by using asymmetric-key cryptography to encrypt decryption keys when symmetric-key cryptography is not possible, the systems and methods described herein may enable encrypted files to be shared even when users are not logged into third-party storage systems. Embodiments of the instant disclosure may also provide various other advantages and features, as discussed in greater detail below.

Figure 2:
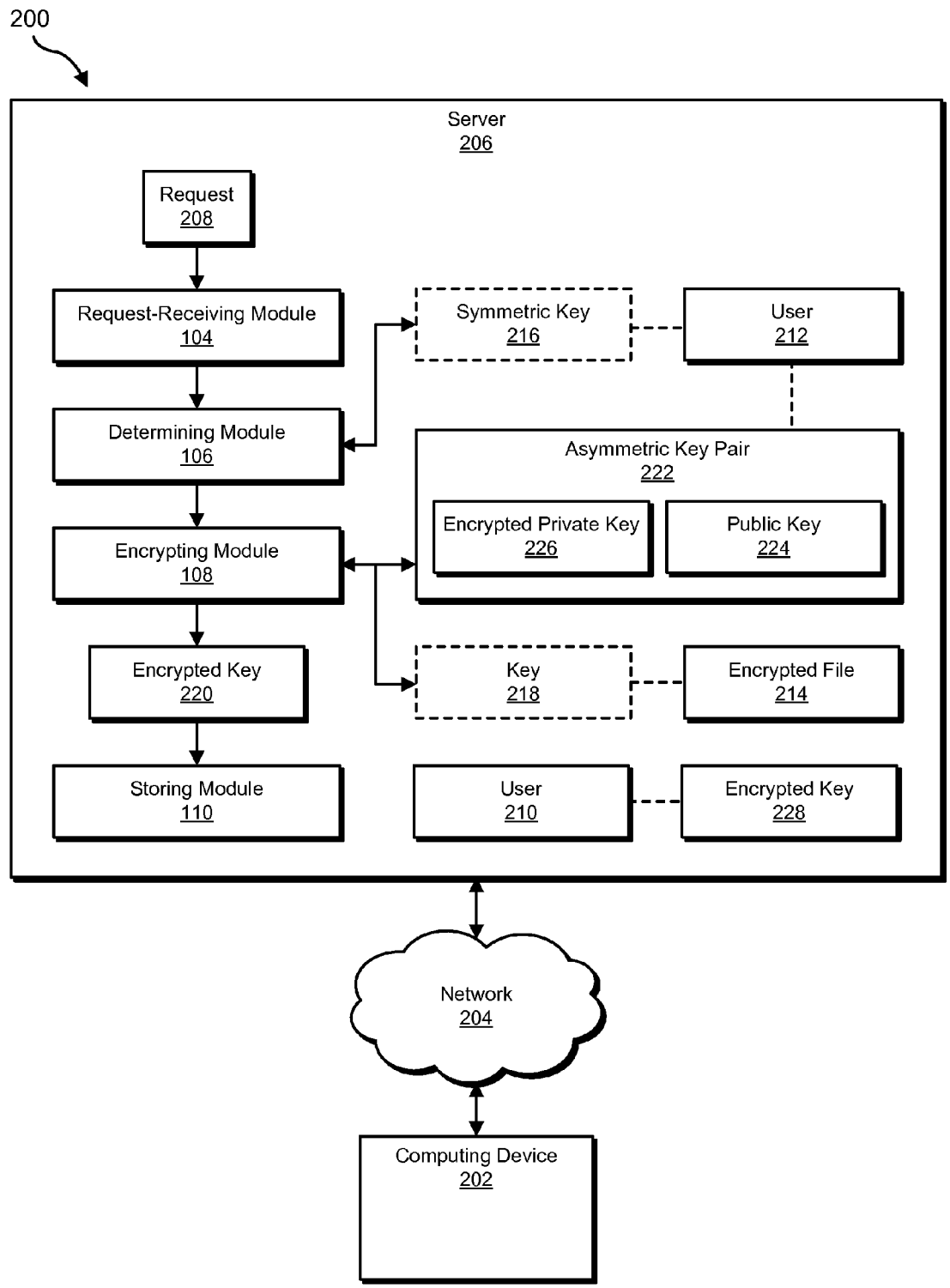
FIG. 2 is a block diagram of an additional exemplary system for securing data at third-party storage services.

The following will provide, with reference to FIGS. 1-2, detailed descriptions of exemplary systems for securing data at third-party storage services. Detailed descriptions of corresponding computer-implemented methods will also be provided in connection with FIGS. 3-10. In addition, detailed descriptions of an exemplary computing system and network architecture capable of implementing one or more of the embodiments described herein will be provided in connection with FIGS. 11 and 12, respectively.

FIG. 1 is a block diagram of an exemplary system 100 for securing data at third-party storage services. As illustrated in this figure, exemplary system 100 may include one or more modules 102 for performing one or more tasks. For example, and as will be explained in greater detail below, exemplary system 100 may include a receiving module 104 that receives, at a server-side computing system, a request to provide a user with access to a file that is encrypted. Exemplary system 100 may also include a determining module 106 that determines whether a transitory symmetric key of the user is available to encrypt a decryption key with which the file may be decrypted.

Exemplary system 100 may further include an encrypting module 108 that (1) in response to determining that the transitory symmetric key of the user is available, encrypts the decryption key with the transitory symmetric key of the user and/or (2) in response to determining that the transitory symmetric key of the user is unavailable, (i) identifies an asymmetric key pair designated for the user that may include a public key and a private key that is encrypted and that may be decrypted using information provided by the user and (ii) encrypts the decryption key with the public key. Exemplary system 100 may also include a storing module 110 that stores the encrypted decryption key at the server-side computing system.

As shown in FIG. 1, exemplary system 100 may also include a key-generating module 112 that generates the transitory symmetric key from information provided by the user. Exemplary system 100 may also include a decrypting module 114 that decrypts the encrypted file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 1110 in FIG. 11, and/or portions of exemplary network architecture 1200 in FIG. 12. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102. Additionally or alternatively, server 206 may be programmed with one or more of modules 102.

In one embodiment, one or more of modules 102 from FIG. 1 may, when executed by at least one processor of computing device 202 and/or server 206, enable computing device 202 and/or server 206 to enable encrypted files to be shared on third-party storage systems. For example, and as will be described in greater detail below, one or more of modules 102 may cause computing device 202 and/or server 206 to (1) receive, at server 206, a request 208 from user 210 to provide a user 212 with access to encrypted file 214 (e.g., a file to which user 210 has access), (2) determine, in response to the request, that symmetric key 216 associated with user 212 is available to encrypt key 218 (e.g., a cryptographic key with which encrypted file 214 may be decrypted), (3) generate encrypted key 220 by encrypting key 218 with symmetric key 216, and (4) store encrypted key 220 at server 206.

Additionally or alternatively, if symmetric key 216 is unavailable to encrypt key 218, one or more of modules 102 may cause computing device 202 and/or server 206 to (1) identify an asymmetric key pair 222 designated for user 212 that includes public key 224 and encrypted private key 226, (2) encrypt key 218 with public key 224, and (3) store the encrypted version of key 218 at server 206.

In one example, encrypted key 228 may represent an encrypted version of key 218 that was generated by encrypting key 218 with a transitory symmetric key associated with user 210. As will be explained in greater detail below, one or more of modules 102 may cause computing device 202 and/or server 206 to generate key 218 by decrypting encrypted key 228 with the transitory symmetric key associated with user 210.

Computing device 202 and server 206 generally represent any type or form of computing device capable of reading computer-executable instructions. Examples of computing device 202 and server 206 include, without limitation, servers, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 1110 in FIG. 11, or any other suitable computing device.

In at least one example, computing device 202 may represent a user's computing device with which the user may access files stored on a third-party storage system. In some examples, computing device 202 may represent a client system that may be owned and/or administrated by an entity distinct from an owner and/or administrator of the third-party storage system. In at least one example, server 206 may represent at least a portion of a third-party storage system.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 1200 in FIG. 12, or the like. Network 204 may facilitate communication or data transfer using wireless or wired connections. In one embodiment, network 204 may facilitate communication between computing device 202 and server 206.

Figure 3:
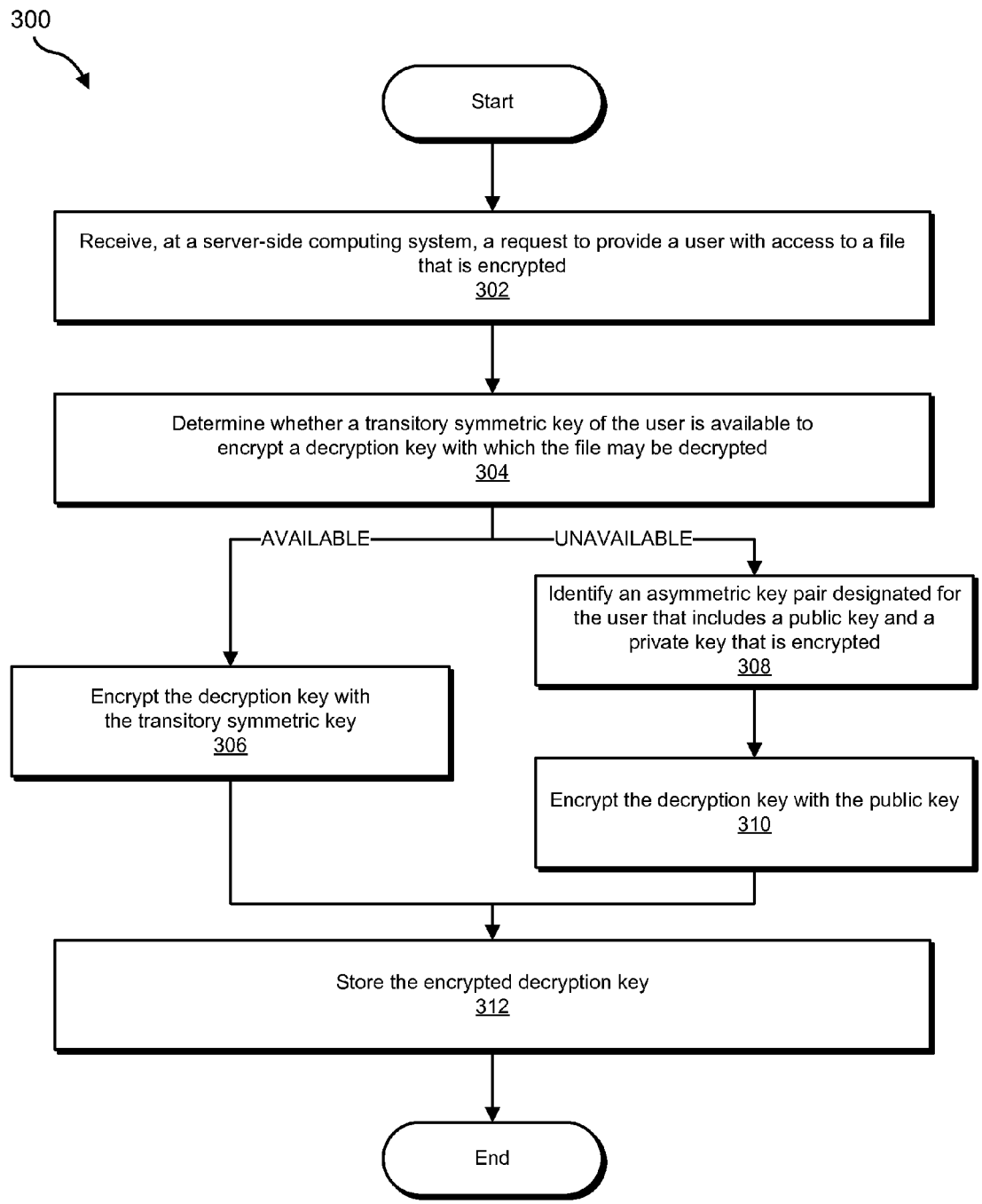
FIG. 3 is a flow diagram of an exemplary method for securing data at third-party storage services.

FIG. 3 is a flow diagram of an exemplary computer-implemented method 300 for securing data at third-party storage services. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 1110 in FIG. 11, and/or portions of exemplary network architecture 1200 in FIG. 12.

As illustrated in FIG. 3, at step 302 one or more of the systems described herein may receive, at a server-side computing system, a request to provide a user with access to a file that is encrypted. For example, receiving module 104 may, as part of server 206 in FIG. 2, receive request 208 from user 210 to provide user 212 with access to encrypted file 214.

The systems described herein may receive a request to provide a user with access to a file that is encrypted in a variety of contexts. In one example, receiving module 104 may receive a request from a user that has access to an encrypted file to provide another user with access to the encrypted file. In some examples, receiving module 104 may receive such a request from the owner of the encrypted file or from a user with whom the owner of the encrypted file has shared access. Using FIG. 2 as an example, receiving module 104 may receive request 208 from user 210 to provide user 212 with access to encrypted file 214 (e.g., a file that was encrypted with key 218). In this example, user 210 may have access to encrypted file 214 via encrypted key 228 (e.g., an encrypted version of key 218 that was encrypted with a user key of user 210).

Additionally or alternatively, receiving module 104 may receive a file from a user or third party with a request to store the file in an encrypted state such that the user has access to the file. In some examples, receiving module 104 may receive a request to provide a user with access to a file that is encrypted while the user is logged into a third-party storage system. Alternatively, receiving module 104 may receive a request to provide a user with access to a file that is encrypted when the user is not logged into a third-party storage system.

As used herein, the phrase "third-party storage system" may refer to any type or form of storage system, including a cloud-based storage system, that is capable of storing data on behalf of one or more users. Examples of third-party storage systems include, without limitation, CARBONITE, ICLOUD, DROPBOX, GOOGLE DRIVE, MICROSOFT SKYDRIVE, and NORTON ZONE. In some examples, the server-side computing system may operate as part of a third-party storage system.

The term "file," as used herein, may refer to any suitable unit of information that may be stored at a third-party storage system. For example, the term "file" may refer to a data object, data segment, portion of a data stream, database, database entry, a search index, and/or an electronic document. The term "user," as used herein, may refer to any file owner and/or any entity capable of accessing files stored at a third-party storage system. In some examples, the term "user" may also refer to an account identifier used, e.g., to identify files owned by an entity, to secure files owned by an entity for use by the entity, and/or to identify files to which access has been shared with the entity.

In some examples, the systems described herein may store a user's files to a third-party storage system in an encrypted state to prevent unauthorized access of the files by other users, intruders (e.g., entities not authorized to access files stored within the third-party storage system), and/or administrators of the third-party storage system. In general, the systems described herein may prevent unauthorized access of files stored to third-party storage systems by (1) encrypting the files with cryptographic keys and (2) limiting which users are provided access to these cryptographic keys.

In one example, the systems described herein may encrypt a file with a file key designated for encrypting and/or decrypting the file and may provide a user with access to the file key by encrypting the file key with a user key designated for the user. For example, the systems describe herein may encrypt a user's file by (1) generating a unique file key for encrypting and/or decrypting the file and (2) encrypting the file with the file key. To secure this file key and to enable the user to access the file, the systems described herein may (1) encrypt the file key with a unique user key designated for the user (e.g., a transitory symmetric key that may be generated using information provided by the user), (2) store the encrypted file and the encrypted file key, and (3) discard the unencrypted file, the unencrypted file key, and the unencrypted user key. Using FIG. 4a as an example, at step 410, encrypting module 108 may, in response to receiving file 402 from a user, generate encrypted file 406 by (1) generating file key 404 and (2) encrypting file 402 with file key 404. At step 412, encrypting module 108 may then generate encrypted file key 410 by encrypting file key 404 with user key 408. After storing encrypted file 406 and encrypted file key 410, encrypting module 108 may discard or forget file 402, file key 404, and user key 408.

Figure 4A:
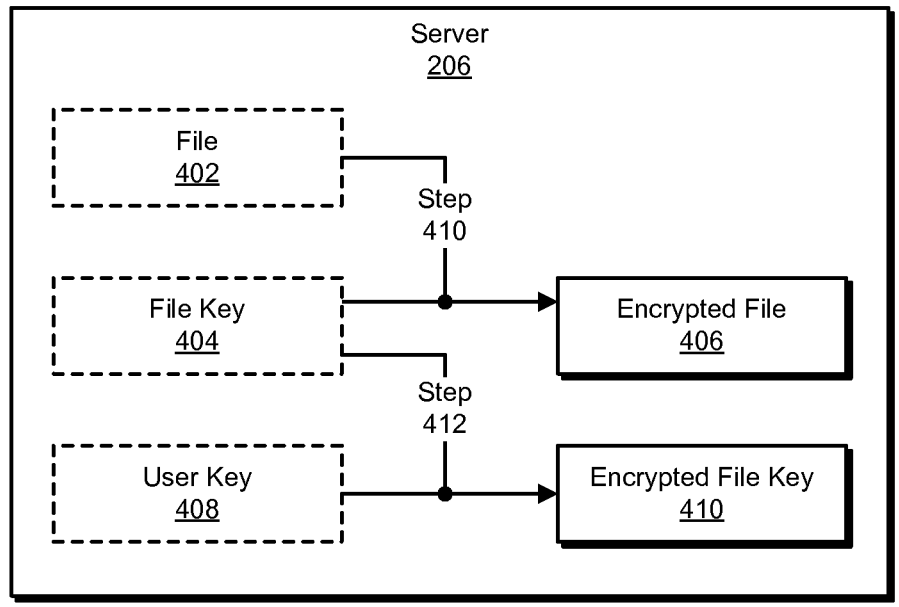
FIG. 4*a* is a block diagram of an additional exemplary system for securing data at third-party storage services.
Figure 4B:
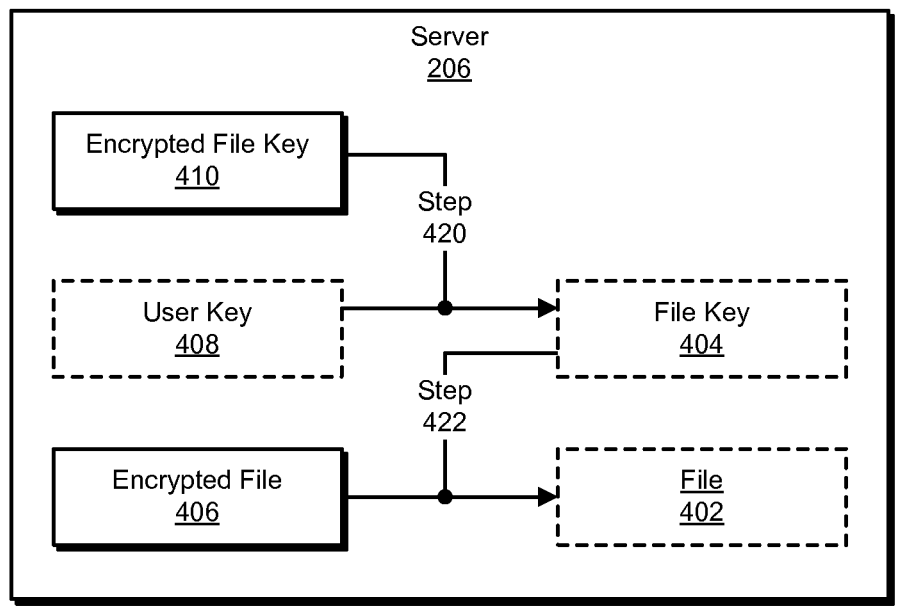
FIG. 4*b* is a block diagram of an additional exemplary system for securing data at third-party storage services.

FIG. 4b illustrates how a user may access a file that was encrypted and stored in the manner described above. At step 420, encrypting module 108 may, in response to a request for file 402, regenerate file key 404 (e.g., the file key used to encrypt file 402) by decrypting encrypted file 410 with user key 408. At step 422, encrypting module 108 may then regenerate file 402 by decrypting encrypted file 406 with file key 404.

In some examples, the systems described herein may encrypt a file with a file key designated for encrypting and/or decrypting the file and may provide a group of users with access to the file key by (1) encrypting the file key with a group key designated for the group of users and (2) encrypting the group key with a user key of each user in the group of users. For example, the systems describe herein may encrypt a file by (1) generating a unique file key for encrypting and/or decrypting the file and (2) encrypting the file with the file key. To secure this file key and to enable each user in a group of users to access the file, the systems described herein may (1) encrypt the file key with a unique group key designated for the group of users, (2) encrypt the group key with a user key designated for each user in the group of users, (3) store the encrypted file, the encrypted file key, and the encrypted group keys, and (4) discard the unencrypted file, the unencrypted file key, the unencrypted group key, and the unencrypted user keys. Using FIG. 5a as an example, at step 520, encrypting module 108 may, in response to receiving file 502, generate encrypted file 506 by (1) generating file key 504 and (2) encrypting file 502 with file key 504. At step 522, encrypting module 108 may then generate encrypted file key 510 by encrypting file key 504 with group key 508. At step 524, encrypting module 108 may then generate encrypted group key 514 by encrypting group key 508 with user key 512. After storing encrypted file 506, encrypted file key 510, and encrypted group key 514, encrypting module 108 may discard or forget file 502, file key 504, group key 508, and user key 512.

Figure 5A:
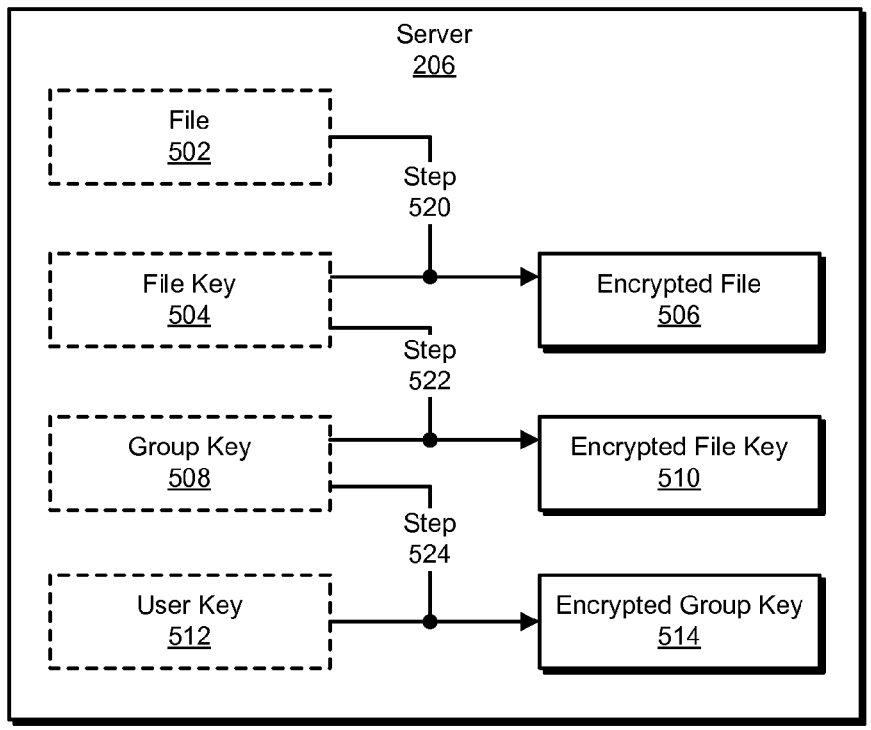
FIG. 5*a* is a block diagram of an additional exemplary system for securing data at third-party storage services.
Figure 5B:
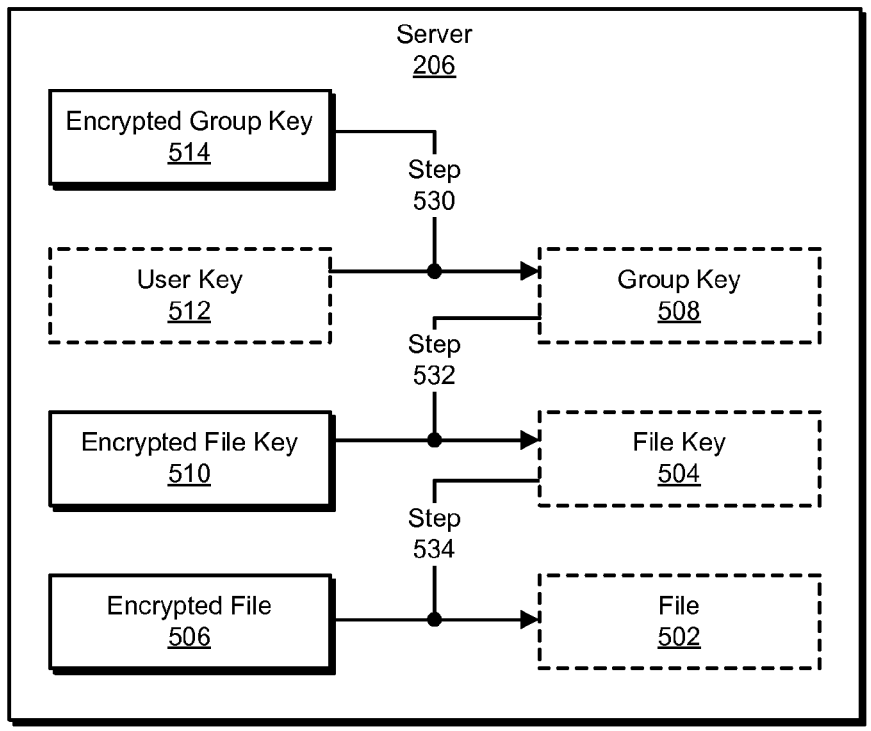
FIG. 5*b* is a block diagram of an additional exemplary system for securing data at third-party storage services.

FIG. 5b illustrates how a user may access a file that was encrypted and stored in the manner described above. At step 530, encrypting module 108 may, in response to a request for file 502, regenerate group key 508 by decrypting encrypted group key 514 with user key 512. At step 532, encrypting module 108 may regenerate file key 504 by decrypting encrypted file 510 with group key 508. At step 534, encrypting module 108 may then regenerate file 502 by decrypting encrypted file 506 with file key 504.

In some examples, the systems described herein may enable users to share access to encrypted files stored to third-party storage systems by enabling users to share access to the cryptographic keys used to generate the encrypted files (e.g., file key 404 in FIG. 4a and file key 504 and group key 508 in FIG. 5a).

Returning to FIG. 3, at step 304, one or more of the systems described herein may determine whether a transitory symmetric key of the user is available to encrypt a decryption key with which the file may be decrypted. For example, determining module 106 may, as part of server 206 in FIG. 2, determine whether symmetric key 216 is available to encrypt key 218.

As used herein, the phrase "transitory symmetric key" may refer to any cryptographic key that may be used to both encrypt and decrypt files. In some examples, the systems and methods described herein may use transitory symmetric keys to limit access to encrypted file stored at third-party storage systems. Using FIGS. 4a, 4b, 5a, and 5b as examples, user key 408 and user key 512 may represent transitory symmetric keys.

In at least one example, the phrase "transitory symmetric key" may refer to any cryptographic key that is available only when a user is logged into a third-party storage system. In some examples, the systems described herein may ensure that a user's transitory symmetric keys are only available at the third-party storage system while the user is logged into the third-party storage system by (1) generating the transitory symmetric keys when the user logs into the third-party storage system and (2) discarding or forgetting the transitory symmetric keys when the user logs out of the third-party storage system or after a login session of the user expires. Because a user's transitory symmetric keys may not be retained after the user logs out of the third-party storage system, the user's files may be inaccessible to unauthorized parties while the user is logged out of the third-party storage system.

In at least one example, the systems described herein may ensure that a user's transitory symmetric keys are only available when the user is logged into a third-party storage system by storing the user's transitory symmetric keys in volatile memory without storing the transitory symmetric keys in non-volatile memory. As used herein, the phrase "volatile memory" may refer to any non-persistent and/or temporary storage location. In some examples, the phrase "volatile memory" may refer to random access memory. In addition, the phrase "non-volatile memory" may refer to any persistent storage location. For example, the phrase "non-volatile memory" may refer to a storage device used by a file system to store one or more files.

In some examples, the systems described herein may generate a user's transitory symmetric keys using information provided by the user (e.g., a password or a client-side key of the user). In some examples, the systems described herein may use information provided by the user to first generate an intermediate key that may be used as a master key from which one or more transitory symmetric keys may be generated for the user.

In one example, key-generating module 112 may generate an intermediate key by applying a key-stretching function (e.g., a key strengthening function or a key-enhancing function) to information provided by the user. Key-generating module 112 may then use the intermediate key to generate one or more transitory symmetric keys using a pseudo-random function. As used herein, the phrase "pseudo-random function" may refer to any function that takes an input and produces a corresponding output that appears random.

In one example, key-generating module 112 may generate two transitory symmetric keys by applying the same pseudo-random function to two unique values generated based on the same intermediate key. For example, key-generating module 112 may generate one symmetric key by applying the pseudo-random function to a value generated by concatenating the intermediate key with "1" and another by applying the same pseudo-random function to a value generated by concatenating the intermediate key with "0".

Figure 6:
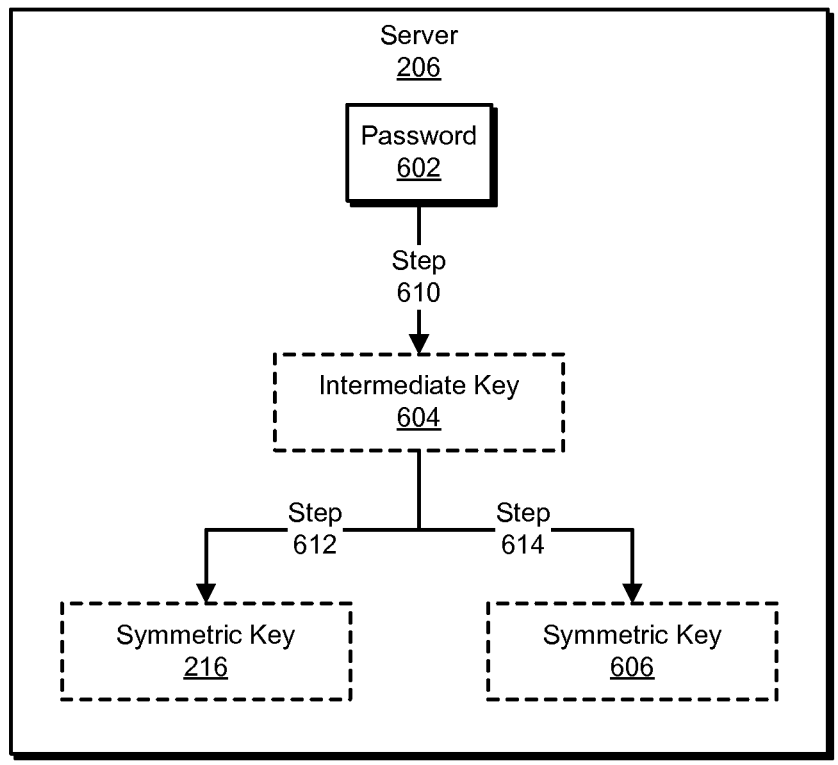
FIG. 6 is a block diagram of an additional exemplary system for securing data at third-party storage services.
Figure 7:
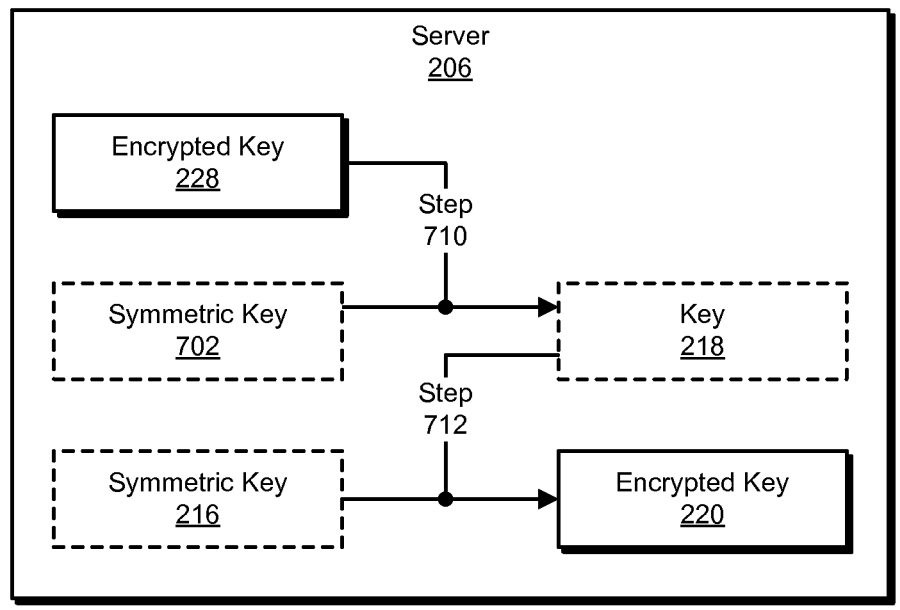
FIG. 7 is a block diagram of an additional exemplary system for securing data at third-party storage services.
Figure 8:
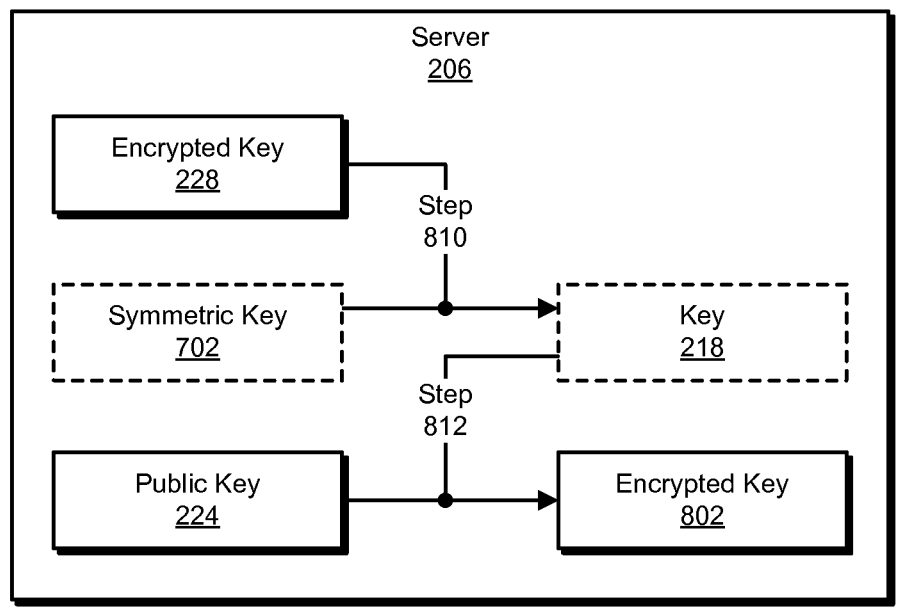
FIG. 8 is a block diagram of an additional exemplary system for securing data at third-party storage services.

Using FIG. 6 as an example, at step 610, key-generating module 112 may generate an intermediate key 604 using a password 602 of a user. At step 612, key-generating module 112 may generate symmetric key 216 by applying a pseudo-random function to a value generated by concatenating intermediate key 604 with "1". Similarly at step 614, key-generating module 112 may generate symmetric key 606 by applying the pseudo-random function to a value generated by concatenating intermediate key 604 with "0".

In some examples, a user may be associated with multiple unique transitory symmetric keys that each are used to perform separate tasks. By using multiple unique transitory symmetric keys for encrypting and/or decrypting data associated with a user, the systems and methods described herein may use a variety of encryption schemes to encrypt the data without compromising security. For example, the systems described herein may generate one transitory symmetric key for providing a user with access to encrypted files and another transitory symmetric key for encrypting and/or decrypting the private key of an asymmetric key pair designated for the user. In the examples contained herein, symmetric key 216 may represent a transitory symmetric key used to encrypt and decrypt files of user 212, and symmetric key 606 may represent a transitory symmetric key used to encrypt and decrypt the private key of an asymmetric key pair designated for user 212 (e.g., encrypted private key 226 of asymmetric key pair 222).

As used herein, the phrase "decryption key" may refer to any cryptographic key that may provide a user with access to an unencrypted version of an encrypted file. Examples of decryption keys include, without limitation, file keys used to encrypt files (e.g., file key 404 in FIG. 4a and file key 504 in FIG. 5a) and group keys used to encrypt file keys (e.g., group key 508 in FIG. 5a).

Returning to FIG. 3, the systems described herein may determine the availability of a user's transitory symmetric keys in any suitable manner. For example, determining module 106 may determine whether key-generating module 112 has generated the user's transitory symmetric keys and/or stored the user's transitory symmetric keys to volatile memory at the server-side computing system. Additionally or alternatively, determining module 106 may determine whether the user is logged into the server-side computing system and/or available to provide any information required to generate the user's transitory symmetric keys.

If a user's transitory symmetric key is available, the systems described herein may proceed to encrypting the decryption key with the transitory symmetric key at step 306. Alternatively, if the user's transitory symmetric key is unavailable, the systems described herein may proceed to encrypting the decryption key with an asymmetric key pair designated for the user at step 308.

At step 306, one or more of the systems described herein may, in response to determining that the transitory symmetric key of the user is available, encrypt the decryption key with the transitory symmetric key of the user. For example, encrypting module 108 may, as part of server 206 in FIG. 2, generate encrypted key 220 by encrypting key 218 with symmetric key 216 if symmetric key 216 is available.

The systems described herein may encrypt a decryption key with a transitory symmetric key using any suitable symmetric-key algorithm. For example, encrypting module 108 may encrypt a decryption key with a transitory symmetric key using a block cipher, a stream cipher, and/or any other type of cipher that uses an encryption key and an initialization vector to encode data.

In some examples, a decryption key may be generated as part of encrypting a file (e.g., as described above in connection with FIGS. 4a and 5a), and encrypting module 108 may encrypt the decryption key as part of encrypting the file.

In other examples, a decryption key may be stored in an encrypted state, and encrypting module 108 may regenerate the decryption key by decrypting an encrypted version of the decryption key before encrypting the same. Using FIG. 7 as an example, at step 710, encrypting module 108 may generate key 218 by decrypting encrypted key 228 with symmetric key 702 (e.g., a transitory symmetric key of user 210). At step 712, encrypting module 108 may generate encrypted key 220 by encrypting key 218 with symmetric key 216.

By encrypting a decryption key with the transitory symmetric key of a user, the systems and methods described herein may provide the user with access to the encrypted files that may be decrypted with the decryption key. After encrypting the decryption key with the transitory symmetric key, the systems described herein may proceed to storing the encrypted key at step 312.

At step 308, one or more of the systems described herein may, in response to determining that the transitory symmetric key of the user is unavailable, identify an asymmetric key pair designated for the user. For example, encrypting module 108 may, as part of server 206 in FIG. 2, identify asymmetric key pair 222 in response to determining that symmetric key 216 is unavailable.

Since a user's transitory symmetric keys may be unavailable when the user is not logged into a third-party storage system, the systems described herein may maintain a distinct asymmetric key pair for the user at the third-party storage system that includes a public key and a private key that is encrypted using a transitory symmetric key of the user. As such, the systems described herein may (1) encrypt decryption keys with the public key of the asymmetric key pair when the transitory symmetric keys of the user are unavailable and (2) later decrypt the decryption keys with the private key of the asymmetric key pair when the user's transitory symmetric keys are made available.

As used herein, the phrase "asymmetric key pair" may refer to any pair of cryptographic keys that includes both an encryption key (or "public key") and a decryption key (or "private key"). The encryption key may include any key that does not require secrecy in order to secure files encrypted with the key. For example, the encryption key may be used to encrypt files using an asymmetric key algorithm. Consequently, decrypting files encrypted with the encryption key may require the corresponding decryption key of the asymmetric key pair. In some examples, the decryption key of an asymmetric key pair may be stored in an encrypted state. In at least one example, the decryption key of an asymmetric key pair designated for a user may be encrypted with a transitory symmetric key of the user. Because a user's transitory symmetric keys may not be retained after the user logs out of the third-party storage system, the decryption key may be inaccessible to unauthorized parties while the user is logged out of the third-party storage system.

At step 310, one or more of the systems described herein may encrypt the decryption key with the public key of the asymmetric key pair. For example, at step 310 encrypting module 108 may, as part of server 206 in FIG. 2, encrypt decryption key 218 with public key 224. The systems described herein may encrypt a decryption key with the public key of an asymmetric key pair using any suitable asymmetric-key algorithm.

In some examples, a decryption key may be generated as part of encrypting a file (e.g., as described above in connection with FIGS. 4a and 5a), and encrypting module 108 may encrypt the decryption key as part of encrypting the file.

In other examples, a decryption key may be stored in an encrypted state, and encrypting module 108 may regenerate the decryption key by decrypting an encrypted version of the decryption key before encrypting the same. Using FIG. 8 as an example, at step 810, encrypting module 108 may generate key 218 by decrypting encrypted key 228 with symmetric key 702 (e.g., a transitory symmetric key of user 210). At step 812, encrypting module 108 may generate encrypted key 802 by encrypting key 218 with public key 224.

By encrypting a decryption key with the public key of an asymmetric key pair designated for a user, the systems and methods described herein may provide the user with access to the encrypted files that may be decrypted with the decryption key.

At step 312, one or more of the systems described herein may store the encrypted decryption key. For example, storing module 110 may, as part of server 206 in FIG. 2, store encrypted key 220 to server 206. Upon completion of step 312, exemplary method 300 in FIG. 3 may terminate.

As explained above, the systems described herein may attempt to use a user's transitory symmetric keys and symmetric-key cryptography when possible to encrypt any decryption keys that may be needed to provide the user with access to encrypted files stored on third-party storage systems. When this occurs, the systems described herein may later access the encrypted files using symmetric-key cryptography rather than asymmetric-key cryptography.

However, as mentioned above, the systems described herein may use asymmetric-key cryptography to encrypt the decryption keys when the user's transitory symmetric keys are unavailable (e.g., when the user is not logged into a third-party storage system). In these situations, the systems described herein may later reencrypt the decryption keys with the user's transitory symmetric keys after the user logs into the third-party storage system and the transitory symmetric keys of the user become available. When this occurs, the systems described herein may access the encrypted files using symmetric-key cryptography rather than asymmetric-key cryptography.

Figure 9:
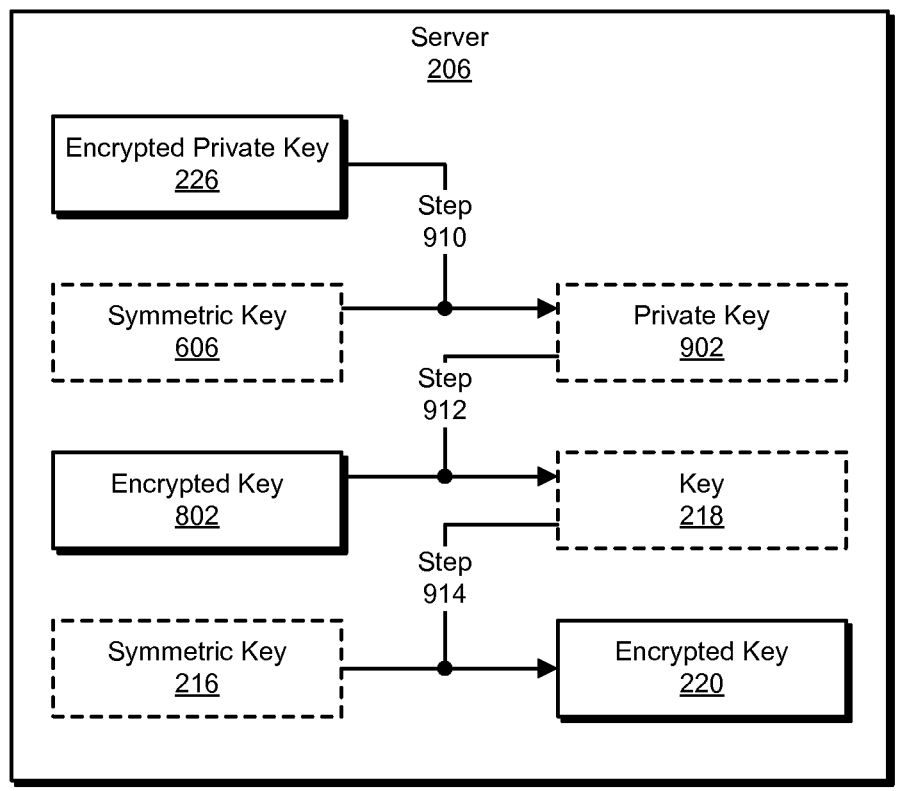
FIG. 9 is a block diagram of an additional exemplary system for securing data at third-party storage services.

FIG. 9 illustrates how the systems and methods described herein may (1) access a decryption key that has been encrypted with the public key of an asymmetric key pair designated for a user and (2) reencrypt it with a transitory symmetric key of the user after the user logs into a third-party storage system and the transitory symmetric key of the user becomes available. For example, at step 910 and after key-generating module 112 has generated symmetric keys 216 and 606 (e.g., as described in connection with FIG. 6), encrypting module 108 may generate private key 902 by decrypting encrypted private key 226 with symmetric key 606. At step 912, encrypting module 108 may then generate key 218 by decrypting encrypted decryption key 802 with private key 902. At step 914, encrypting module 108 may then generate encrypted key 220 by encrypting key 218 with symmetric key 216.

Figure 10:
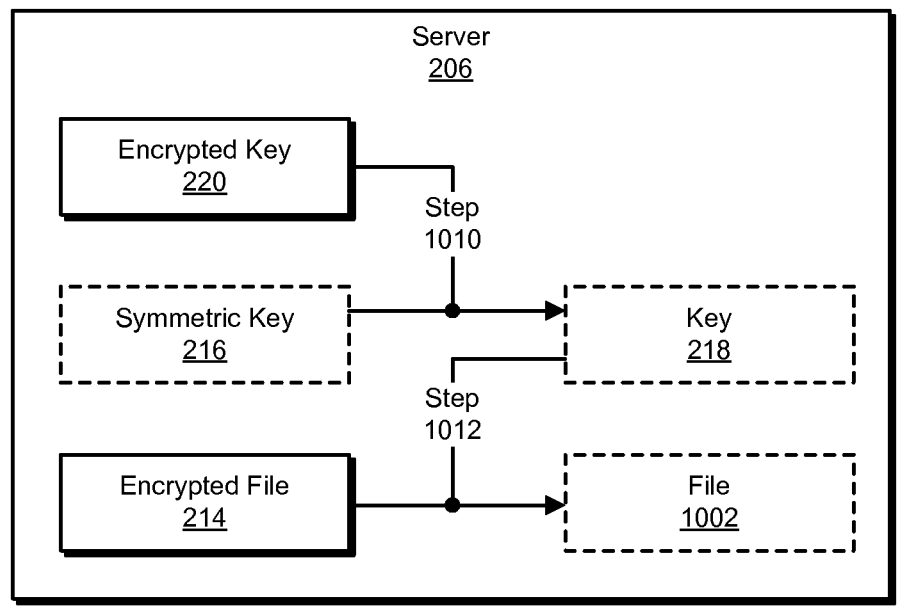
FIG. 10 is a block diagram of an additional exemplary system for securing data at third-party storage services.

FIG. 10 illustrates how the systems and methods described herein may respond to receiving a request from a user to access a file. In this example, user 212 may be logged into server 206, and symmetric key 216 may be available. At step 1010, decrypting module 114 may, in response to receiving a request from user 212 for an unencrypted version of encrypted file 214, generate key 218 by decrypting encrypted key 220 with symmetric key 216. Then, at step 1012, decrypting module 114 may generate file 1002 (e.g., an unencrypted version of encrypted file 214) by decrypting encrypted file 214 with key 218. Decrypting module 114 may then respond to the request from user 212 with file 1002.

As explained above, by encrypting a user's files stored on a third-party storage system with transitory symmetric keys that are (1) generated from information provided by the user and (2) discarded or forgotten when the user logs out of the third-party storage system, the systems and methods described herein may improve the security of the user's files stored at the third-party storage system, especially when the user is not logged into the third-party storage system.

Moreover, by using symmetric-key cryptography instead of asymmetric-key cryptography to encrypt decryption keys when possible, the systems and methods described herein may reduce the computational load required to encrypt and share files. Furthermore, in some examples, by using asymmetric-key cryptography to encrypt decryption keys when symmetric-key cryptography is not possible, the systems and methods described herein may enable encrypted files to be shared even when users are not logged into third-party storage systems.

Figure 11:
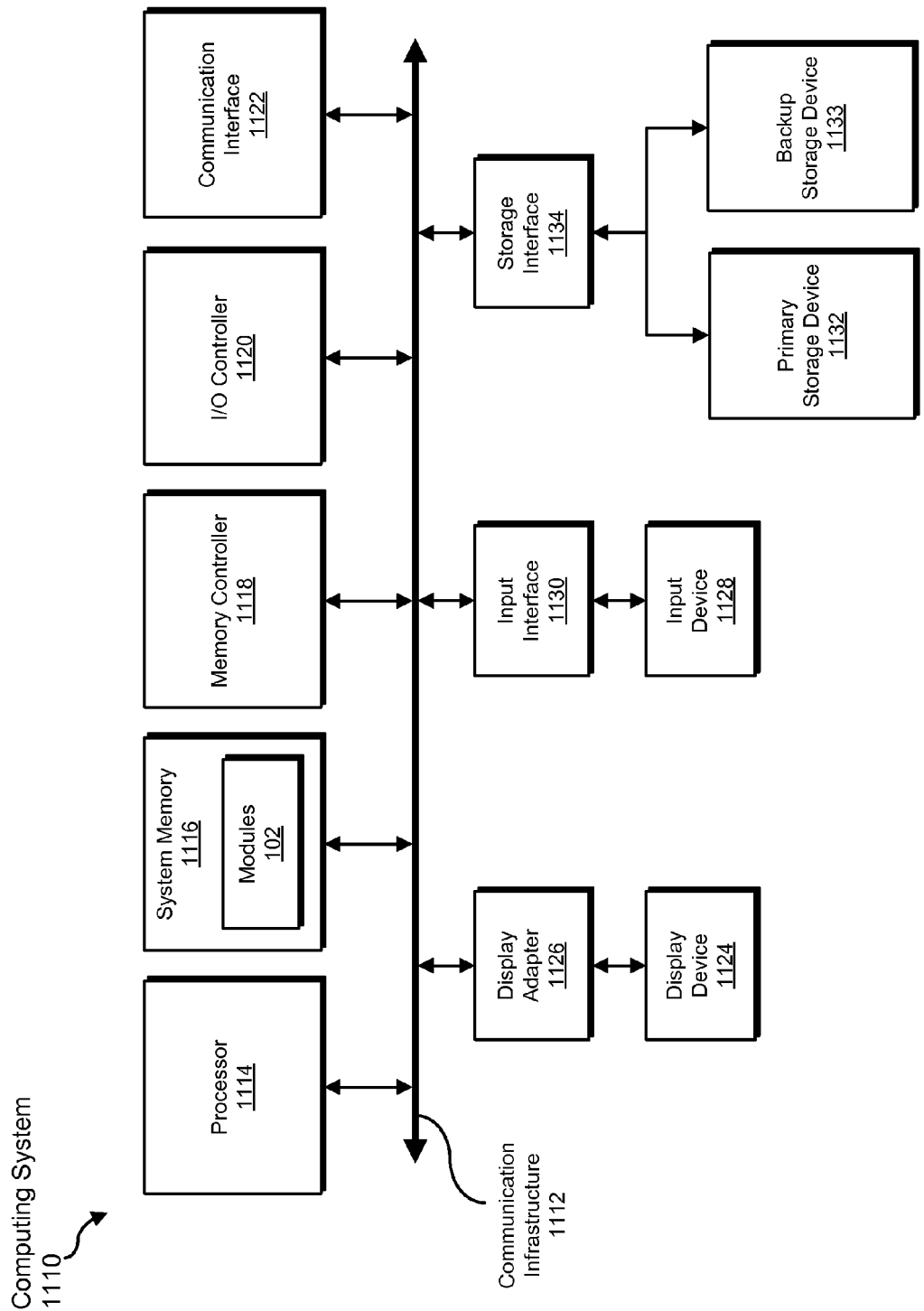
FIG. 11 is a block diagram of an exemplary computing system capable of implementing one or more of the embodiments described and/or illustrated herein.

FIG. 11 is a block diagram of an exemplary computing system 1110 capable of implementing one or more of the embodiments described and/or illustrated herein. For example, all or a portion of computing system 1110 may perform and/or be a means for performing, either alone or in combination with other elements, one or more of the steps described herein (such as one or more of the steps illustrated in FIG. 3). All or a portion of computing system 1110 may also perform and/or be a means for performing any other steps, methods, or processes described and/or illustrated herein.

Computing system 1110 broadly represents any single or multi-processor computing device or system capable of executing computer-readable instructions. Examples of computing system 1110 include, without limitation, workstations, laptops, client-side terminals, servers, distributed computing systems, handheld devices, or any other computing system or device. In its most basic configuration, computing system 1110 may include at least one processor 1114 and a system memory 1116.

Processor 1114 generally represents any type or form of physical processing unit (e.g., a hardware-implemented central processing unit) capable of processing data or interpreting and executing instructions. In certain embodiments, processor 1114 may receive instructions from a software application or module. These instructions may cause processor 1114 to perform the functions of one or more of the exemplary embodiments described and/or illustrated herein.

System memory 1116 generally represents any type or form of volatile or non-volatile storage device or medium capable of storing data and/or other computer-readable instructions. Examples of system memory 1116 include, without limitation, Random Access Memory (RAM), Read Only Memory (ROM), flash memory, or any other suitable memory device. Although not required, in certain embodiments computing system 1110 may include both a volatile memory unit (such as, for example, system memory 1116) and a non-volatile storage device (such as, for example, primary storage device 1132, as described in detail below). In one example, one or more of modules 102 from FIG. 1 may be loaded into system memory 1116.

In certain embodiments, exemplary computing system 1110 may also include one or more components or elements in addition to processor 1114 and system memory 1116. For example, as illustrated in FIG. 11, computing system 1110 may include a memory controller 1118, an Input/Output (I/O) controller 1120, and a communication interface 1122, each of which may be interconnected via a communication infrastructure 1112. Communication infrastructure 1112 generally represents any type or form of infrastructure capable of facilitating communication between one or more components of a computing device. Examples of communication infrastructure 1112 include, without limitation, a communication bus (such as an Industry Standard Architecture (ISA), Peripheral Component Interconnect (PCI), PCI Express (PCIe), or similar bus) and a network.

Memory controller 1118 generally represents any type or form of device capable of handling memory or data or controlling communication between one or more components of computing system 1110. For example, in certain embodiments memory controller 1118 may control communication between processor 1114, system memory 1116, and I/O controller 1120 via communication infrastructure 1112.

I/O controller 1120 generally represents any type or form of module capable of coordinating and/or controlling the input and output functions of a computing device. For example, in certain embodiments I/O controller 1120 may control or facilitate transfer of data between one or more elements of computing system 1110, such as processor 1114, system memory 1116, communication interface 1122, display adapter 1126, input interface 1130, and storage interface 1134.

Communication interface 1122 broadly represents any type or form of communication device or adapter capable of facilitating communication between exemplary computing system 1110 and one or more additional devices. For example, in certain embodiments communication interface 1122 may facilitate communication between computing system 1110 and a private or public network including additional computing systems. Examples of communication interface 1122 include, without limitation, a wired network interface (such as a network interface card), a wireless network interface (such as a wireless network interface card), a modem, and any other suitable interface. In at least one embodiment, communication interface 1122 may provide a direct connection to a remote server via a direct link to a network, such as the Internet. Communication interface 1122 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1122 may also represent a host adapter configured to facilitate communication between computing system 1110 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1122 may also allow computing system 1110 to engage in distributed or remote computing. For example, communication interface 1122 may receive instructions from a remote device or send instructions to a remote device for execution.

As illustrated in FIG. 11, computing system 1110 may also include at least one display device 1124 coupled to communication infrastructure 1112 via a display adapter 1126. Display device 1124 generally represents any type or form of device capable of visually displaying information forwarded by display adapter 1126. Similarly, display adapter 1126 generally represents any type or form of device configured to forward graphics, text, and other data from communication infrastructure 1112 (or from a frame buffer, as known in the art) for display on display device 1124.

As illustrated in FIG. 11, exemplary computing system 1110 may also include at least one input device 1128 coupled to communication infrastructure 1112 via an input interface 1130. Input device 1128 generally represents any type or form of input device capable of providing input, either computer or human generated, to exemplary computing system 1110. Examples of input device 1128 include, without limitation, a keyboard, a pointing device, a speech recognition device, or any other input device.

As illustrated in FIG. 11, exemplary computing system 1110 may also include a primary storage device 1132 and a backup storage device 1133 coupled to communication infrastructure 1112 via a storage interface 1134. Storage devices 1132 and 1133 generally represent any type or form of storage device or medium capable of storing data and/or other computer-readable instructions. For example, storage devices 1132 and 1133 may be a magnetic disk drive (e.g., a so-called hard drive), a solid state drive, a floppy disk drive, a magnetic tape drive, an optical disk drive, a flash drive, or the like. Storage interface 1134 generally represents any type or form of interface or device for transferring data between storage devices 1132 and 1133 and other components of computing system 1110.

In certain embodiments, storage devices 1132 and 1133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1133 may also include other similar structures or devices for allowing computer software, data, or other computer-readable instructions to be loaded into computing system 1110. For example, storage devices 1132 and 1133 may be configured to read and write software, data, or other computer-readable information. Storage devices 1132 and 1133 may also be a part of computing system 1110 or may be a separate device accessed through other interface systems.

Many other devices or subsystems may be connected to computing system 1110. Conversely, all of the components and devices illustrated in FIG. 11 need not be present to practice the embodiments described and/or illustrated herein. The devices and subsystems referenced above may also be interconnected in different ways from that shown in FIG. 11. Computing system 1110 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 1110. All or a portion of the computer program stored on the computer-readable medium may then be stored in system memory 1116 and/or various portions of storage devices 1132 and 1133. When executed by processor 1114, a computer program loaded into computing system 1110 may cause processor 1114 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1110 may be configured as an Application Specific Integrated Circuit (ASIC) adapted to implement one or more of the exemplary embodiments disclosed herein.

Figure 12:
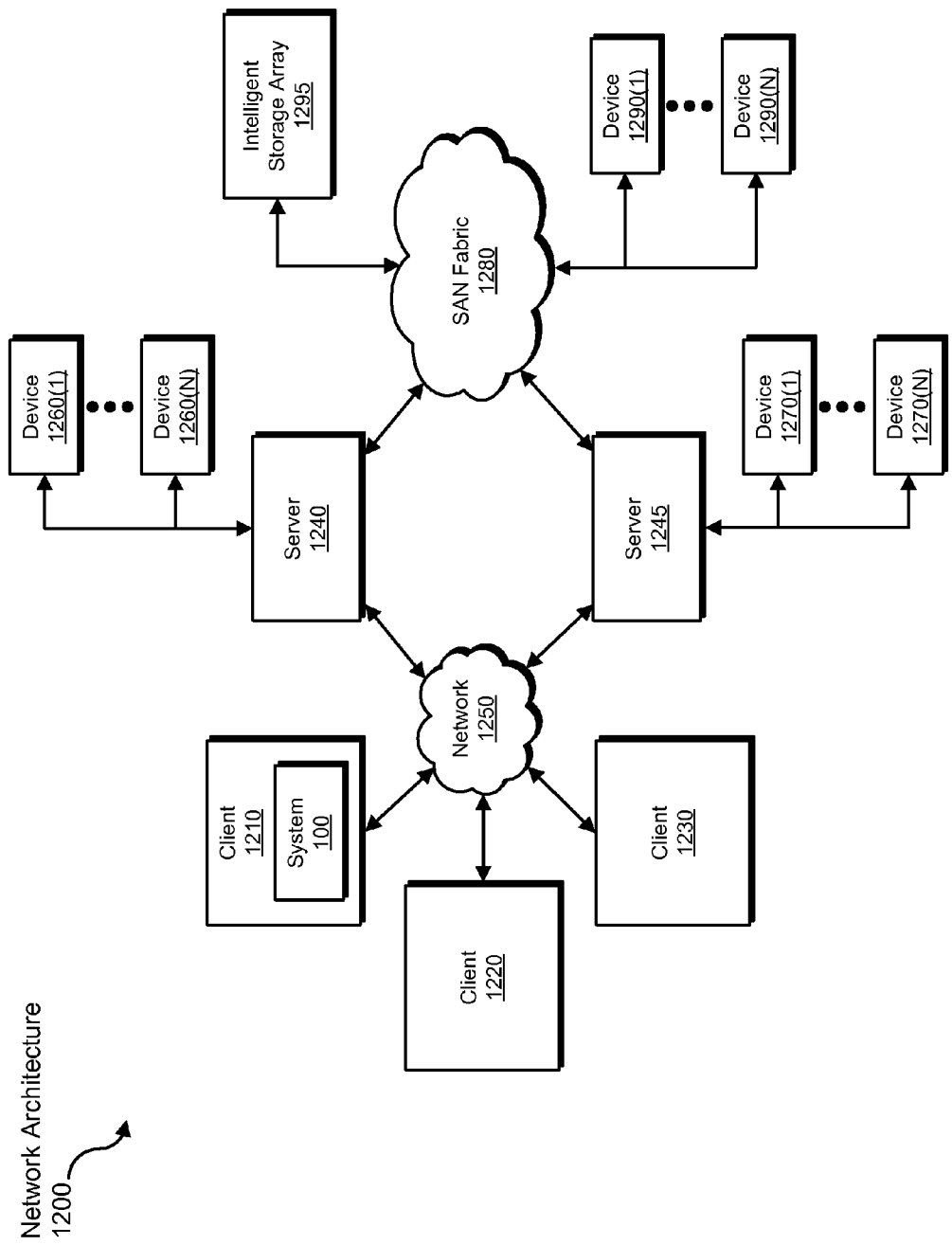
FIG. 12 is a block diagram of an exemplary computing network capable of implementing one or more of the embodiments described and/or illustrated herein.

FIG. 12 is a block diagram of an exemplary network architecture 1200 in which client systems 1210, 1220, and 1230 and servers 1240 and 1245 may be coupled to a network 1250. As detailed above, all or a portion of network architecture 1200 may perform and/or be a means for performing, either alone or in combination with other elements, one or more of the steps disclosed herein (such as one or more of the steps illustrated in FIG. 3). All or a portion of network architecture 1200 may also be used to perform and/or be a means for performing other steps and features set forth in the instant disclosure.

Client systems 1210, 1220, and 1230 generally represent any type or form of computing device or system, such as exemplary computing system 1110 in FIG. 11. Similarly, servers 1240 and 1245 generally represent computing devices or systems, such as application servers or database servers, configured to provide various database services and/or run certain software applications. Network 1250 generally represents any telecommunication or computer network including, for example, an intranet, a WAN, a LAN, a PAN, or the Internet. In one example, client systems 1210, 1220, and/or 1230 and/or servers 1240 and/or 1245 may include all or a portion of system 100 from FIG. 1.

As illustrated in FIG. 12, one or more storage devices 1260(1)-(N) may be directly attached to server 1240. Similarly, one or more storage devices 1270(1)-(N) may be directly attached to server 1245. Storage devices 1260(1)-(N) and storage devices 1270(1)-(N) generally represent any type or form of storage device or medium capable of storing data and/or other computer-readable instructions. In certain embodiments, storage devices 1260(1)-(N) and storage devices 1270(1)-(N) may represent Network-Attached Storage (NAS) devices configured to communicate with servers 1240 and 1245 using various protocols, such as Network File System (NFS), Server Message Block (SMB), or Common Internet File System (CIFS).

Servers 1240 and 1245 may also be connected to a Storage Area Network (SAN) fabric 1280. SAN fabric 1280 generally represents any type or form of computer network or architecture capable of facilitating communication between a plurality of storage devices. SAN fabric 1280 may facilitate communication between servers 1240 and 1245 and a plurality of storage devices 1290(1)-(N) and/or an intelligent storage array 1295. SAN fabric 1280 may also facilitate, via network 1250 and servers 1240 and 1245, communication between client systems 1210, 1220, and 1230 and storage devices 1290(1)-(N) and/or intelligent storage array 1295 in such a manner that devices 1290(1)-(N) and array 1295 appear as locally attached devices to client systems 1210, 1220, and 1230. As with storage devices 1260(1)-(N) and storage devices 1270(1)-(N), storage devices 1290(1)-(N) and intelligent storage array 1295 generally represent any type or form of storage device or medium capable of storing data and/or other computer-readable instructions.

In certain embodiments, and with reference to exemplary computing system 1110 of FIG. 11, a communication interface, such as communication interface 1122 in FIG. 11, may be used to provide connectivity between each client system 1210, 1220, and 1230 and network 1250. Client systems 1210, 1220, and 1230 may be able to access information on server 1240 or 1245 using, for example, a web browser or other client software. Such software may allow client systems 1210, 1220, and 1230 to access data hosted by server 1240, server 1245, storage devices 1260(1)-(N), storage devices 1270(1)-(N), storage devices 1290(1)-(N), or intelligent storage array 1295. Although FIG. 12 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1240, server 1245, storage devices 1260(1)-(N), storage devices 1270(1)-(N), storage devices 1290(1)-(N), intelligent storage array 1295, or any combination thereof. All or a portion of one or more of the exemplary embodiments disclosed herein may also be encoded as a computer program, stored in server 1240, run by server 1245, and distributed to client systems 1210, 1220, and 1230 over network 1250.

As detailed above, computing system 1110 and/or one or more components of network architecture 1200 may perform and/or be a means for performing, either alone or in combination with other elements, one or more steps of an exemplary method for securing data at third-party storage services.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted systems that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a decryption key to transform (e.g., a decryption key with which a user may access an encrypted file), transform the decryption key into an encrypted decryption key to which the user has access, output a result of the transformation to a third-party storage system that stores the encrypted file, use the result of the transformation to provide the user with access to the encrypted file, and store the result of the transformation to the third-party storage system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for securing data at third-party storage services, at least a portion of the method being performed by a computing device comprising at least one processor, the method comprising:
   receiving, from a client-side computing device of a first user at a server-side computing system, a request to share with a second user access to a file that is encrypted, wherein:
      access to the file requires access to a decryption key with which the file may be decrypted;
      the decryption key must be encrypted to be stored at the server-side computing system;
   determining, in response to the request, whether a transitory symmetric key of the second user is available at the server-side computing system to encrypt the decryption key, wherein the transitory symmetric key of the second user is generated at the server-side computing system using information provided to the server-side computing system by the second user and discarded at the server-side computing system when the second user logs out of the server-side computing system;
   in response to determining that the transitory symmetric key of the second user is available at the server-side computing system, encrypting the decryption key with the transitory symmetric key of the second user;
   in response to determining that the transitory symmetric key of the second user is unavailable at the server-side computing system:
      identifying, at the server-side computing system, an asymmetric key pair designated for the second user, the asymmetric key pair comprising:
         a public key;
         a private key that is encrypted, wherein the private key is decrypted using information provided to the server-side computing system by the second user;
      encrypting the decryption key with the public key;
   storing the encrypted decryption key at the server-side computing system, wherein:
      the server-side computing system comprises the computing device;
      the computing device performs the step of determining whether the transitory symmetric key of the second user is available at the server-side computing system.

2. The computer-implemented method of claim 1, wherein the transitory symmetric key of the second user is available to encrypt the decryption key only when the second user is logged into the server-side computing system.

3. The computer-implemented method of claim 1, wherein the private key is encrypted and decrypted with an additional transitory symmetric key of the second user that is generated using information provided to the server-side computing system by the second user.

4. The computer-implemented method of claim 1, further comprising:
   receiving, at the server-side computing system, a password of the second user as part of an attempt by the second user to log into the server-side computing system;
   generating the transitory symmetric key of the second user based at least in part on the password.

5. The computer-implemented method of claim 4, wherein generating the transitory symmetric key of the second user comprises:
   generating an intermediate key by applying a key-stretching function to the password of the second user;
   generating the transitory symmetric key by applying a pseudo-random function to the intermediate key.

6. The computer-implemented method of claim 5, further comprising:
  generating an additional transitory symmetric key by applying the pseudo-random function to the intermediate key, wherein:
    the additional transitory symmetric key and the transitory symmetric key are different;
    the encrypted private key is decrypted with the additional transitory symmetric key;
  decrypting the private key with the additional transitory symmetric key;
  decrypting the decryption key with the private key;
  encrypting the decryption key with the transitory symmetric key.

7. The computer-implemented method of claim 1, further comprising:
  receiving a request from the second user to access the file;
  decrypting the decryption key with the transitory symmetric key;
  using the decryption key to access the file;
  providing access to the file to the second user.

8. The computer-implemented method of claim 7, wherein:
  the decryption key comprises a group key that is:
    used to encrypt and decrypt a file key designated for encrypting and decrypting the file;
    accessible to at least two users that share access to the file;
  using the decryption key to access the file comprises:
    decrypting the file key with the group key;
    decrypting the file with the file key.

9. The computer-implemented method of claim 1, wherein the file comprises a document.

10. The computer-implemented method of claim 1, wherein the file comprises a search index.

11. A system for securing data at third-party storage services, the system comprising:
  a receiving module, stored in memory, that receives, from a client-side computing device of a first user at a server-side computing system, a request to share with a second user access to a file that is encrypted, wherein:
    access to the file requires access to a decryption key with which the file may be decrypted;
    the decryption key must be encrypted to be stored at the server-side computing system;
  a determining module, stored in memory, that determines, in response to the request, whether a transitory symmetric key of the second user is available at the server-side computing system to encrypt the decryption key, wherein the transitory symmetric key of the second user is generated at the server-side computing system using information provided to the server-side computing system by the second user and discarded at the server-side computing system when the second user logs out of the server-side computing system;
  an encrypting module, stored in memory, that:
    in response to determining that the transitory symmetric key of the second user is available at the server-side computing system, encrypts the decryption key with the transitory symmetric key of the second user;
    in response to determining that the transitory symmetric key of the second user is unavailable at the server-side computing system:
      identifies, at the server-side computing system, an asymmetric key pair designated for the second user, the asymmetric key pair comprising:
        a public key;
        a private key that is encrypted, wherein the private key is decrypted using information provided to the server-side computing system by the second user;
      encrypts the decryption key with the public key;
  a storing module, stored in memory, that stores the encrypted decryption key at the server-side computing system;
  at least one processor that executes the receiving module, the determining module, the encrypting module, and the storing module.

12. The system of claim 11, wherein the transitory symmetric key of the second user is available to encrypt the decryption key only when the second user is logged into the server-side computing system.

13. The system of claim 11, wherein the private key is encrypted and decrypted with an additional transitory symmetric key of the second user that is generated using information provided to the server-side computing system by the second user.

14. The system of claim 11, further comprising a key-generating module, stored in memory, that:
  receives, at the server-side computing system, a password of the second user as part of an attempt by the second user to log into the server-side computing system;
  generates the transitory symmetric key of the second user based at least in part on the password.

15. The system of claim 14, wherein the key-generating module generates the transitory symmetric key of the second user by:
  generating an intermediate key by applying a key-stretching function to the password of the second user;
  generating the transitory symmetric key by applying a pseudo-random function to the intermediate key.

16. The system of claim 15, further comprising a decrypting module that is stored in memory, wherein:
  the key-generating module further generates an additional transitory symmetric key by applying the pseudo-random function to the intermediate key, wherein:
    the additional transitory symmetric key and the transitory symmetric key are different;
    the encrypted private key is decrypted with the additional transitory symmetric key;
  the decrypting module:
  decrypts the private key with the additional transitory symmetric key;
  decrypts the decryption key with the private key;
  the encrypting module encrypts the decryption key with the transitory symmetric key.

17. The system of claim 11, further comprising a decrypting module, stored in memory, that:
  receives a request from the second user to access the file;
  decrypts the decryption key with the transitory symmetric key;
  uses the decryption key to access the file;
  provides access to the file to the second user.

18. The system of claim 17, wherein:
  the decryption key comprises a group key that is:
  used to encrypt and decrypt a file key designated for encrypting and decrypting the file;
  accessible to at least two users that share access to the file;
  the decrypting module uses the decryption key to access the file by:
  decrypting the file key with the group key;
  decrypting the file with the file key.

19. The system of claim 11, wherein the file comprises at least one of:
  a document;
  a search index.

20. A non-transitory computer-readable medium comprising one or more computer-executable instructions that, when executed by at least one processor of a computing device, cause the computing device to:
  receive, from a client-side computing device of a first user at a server-side computing system, a request to share with a second user access to a file that is encrypted, wherein:
    access to the file requires access to a decryption key with which the file may be decrypted;
    the decryption key must be encrypted to be stored at the server-side computing system;
  determine, in response to the request, whether a transitory symmetric key of the second user is available at the server-side computing system to encrypt the decryption key, wherein the transitory symmetric key of the second user is generated at the server-side computing system using information provided to the server-side computing system by the second user and discarded at the server-side computing system when the second user logs out of the server-side computing system;
  in response to determining that the transitory symmetric key of the second user is available at the server-side computing system, encrypt the decryption key with the transitory symmetric key of the second user;
  in response to determining that the transitory symmetric key of the second user is unavailable at the server-side computing system:
    identify, at the server-side computing system, an asymmetric key pair designated for the second user, the asymmetric key pair comprising:
      a public key;
      a private key that is encrypted, wherein the private key is decrypted using information provided to the server-side computing system by the second user;
    encrypt the decryption key with the public key;
  store the encrypted decryption key at the server-side computing system.

* * * * *